United States Patent

[11] 3,608,031

[72] Inventors Fritz Stastny
 3 Ottweilerstrasse, Ludwigshafen, Rhine;
 Rudolf Gaeth, 10 Weinbietstrasse,
 Limburgerhof, Pfalz; Hans-Georg
 Trieschmann, 23 Birkenweg, Hambach,
 Weinstrasse; Johann Zizlsperger, 22 Carl-
 Bosch-Ring, Frankenthal, Pfalz, all of
 Germany
[21] Appl. No. 639,656
[22] Filed May 19, 1967
[45] Patented Sept. 21, 1971
[32] Priority May 27, 1966
[33] Germany
[31] P 16 69 648.3

[54] PRODUCTION OF EXPANDED OLEFIN POLYMER MOLDINGS
 4 Claims, No Drawings

[52] U.S. Cl. ................................................. 264/126,
 260/2.5, 264/51, 264/236, 264/331
[51] Int. Cl. ................................................. B29g 7/02,
 C08f 47/08, C08g 22/44
[50] Field of Search .................................. 264/331,
 55, 53, 126, 128, 123, 54, 51, 236; 260/2.5 AX,
 2.5 AK, 2.5 R

[56] References Cited
UNITED STATES PATENTS

| | | | |
|---|---|---|---|
| 2,787,809 | 4/1957 | Stastny | 264/53 |
| 2,861,046 | 11/1958 | Stastny | 264/53 |
| 3,044,970 | 7/1962 | Baumeister et al. | 260/2.5 |
| 3,379,802 | 4/1968 | Raley et al. | 264/53 |

OTHER REFERENCES

Stastny, " New Methods For Fabrication of Styropor" pages 15– 17 264/45 reprint from " Der Plastiverarbeiter," 7, 242– 250 (1955)

Primary Examiner—Robert F. White
Assistant Examiner—Jeffrey R. Thurlow
Attorney—Johnston, Root, O'Keefe, Keil, Thompson & Shurtleff ABSTRACT: Production of moldings of expanded olefin polymers by mixing expanded particles of ethylene or propylene polymers with at least 0.3 gram/liter of said expanded particles of curable binders which contain less than 5 percent solvent based on the amount of binder, compressing the mixture by 5 percent to 70 percent of the bulk volume and curing the compressed mixture under pressure.

PRODUCTION OF EXPANDED OLEFIN POLYMER MOLDINGS

This invention relates to a process for the production of moldings from expanded olefin polymers in which expanded particles of the polymer mixed with a binder are pressed in molds.

It is already known that expanded thermoplastics moldings can be prepared by mixing particulate expanded plastics with binders and allowing the mixtures to cure. Thus for example moldings of particulate expanded styrene polymers have been prepared by bonding the particles with epoxide resins or polyester resins. Boards and sheets prepared according to this method are hard and break under flexural stress. For particular applications, such as floor insulation in houses, however, sheets from particulate plastics are required which are subjected to high bending stresses.

We have now found that expanded olefin polymer moldings having particularly advantageous properties are obtained by mixing a particulate olefin polymer with a curable binder which is free from solvent, compressing the mixture by 10% to 70% of its original bulk volume and effecting curing under pressure.

Olefin polymers in accordance with this invention include polymers of ethylene or propylene. Olefin polymers whose X-ray crystallinity at 25° C. is more than 25% are particularly suitable for the process. Examples are homopolymers and copolymers of ethylene or propylene. Copolymers of ethylene with other ethylenically unsaturated monomers which contain at least 50% by weight of copolymerized units of the olefin are particularly suitable for the process. Copolymers of ethylene with 5% to 30% by weight of esters of acrylic acid, esters of methacrylic acid or esters of vinylcarboxylic acids, are especially suitable. n-Butyl acrylate, tert-butyl acrylate and vinyl acetate have particular importance among the comonomers. Mixtures of the olefin polymers with one another or with other polymerized compounds may also be used.

The olefin polymers are used in the form of expanded particles mm., whose diameter is from 3 to 50 mm., preferably from 5 to 20 mm. Expanded particles (also known as foam particles) are defined as particles in which the cell membranes consist of the olefin polymer. It is preferred to use particles having predominantly closed-cell structure. The expanded particles are obtained by conventional industrial methods, for example by mixing an olefin polymer with an expanding agent in an extruder and extruding the mixture through a die, the extrudate containing expanding agent being comminuted immediately after it leaves the die and before it expands. It is also possible however to use particles which have been obtained by heating mixtures of olefin polymers and expanding agents which decompose with the formation of gaseous products. Particles whose bulk density is from 5 to 200, preferably from 10 to 60 g./l., are particularly suitable.

The particulate expanded olefin polymers are mixed with curable binders which are free from solvent. All curable binders free from solvent are suitable in principle but within this group of substances the unsaturated polyester resins and the epoxide resins have special importance. Polyester resins are mixtures of unsaturated polyesters and polymerizable monomers, such as styrene. Among the epoxide resins (also known technically as polyepoxides) conventional commercially available compounds containing epoxy groups, and mixtures thereof, which are capable of being processed with curing agents, such as primary diamines and secondary diamines, are suitable. Polyester resins and epoxide resins are described for example in the handbook of Houben-Weyl "Methoden der organischen Chemie," 4th edition, volume XIV/2, part 2, Georg Thieme-Verlag, pages 34 et seq.

Polyurethane-forming mixtures, for example mixtures of diisocyanates and polyols, such as are used for the production of polyurethane plastics, are also suitable as binders. Low molecular weight polymerizable compounds containing double bonds may also sometimes be used as binders and these advantageously contain high molecular weight substances as thickeners. Solutions of polymethyl methacrylate in monomeric methyl methacrylate are for example suitable. Polybutadiene oils together with vulcanizing agents may also be used in some cases.

The amount of binder required for the process depends on the particle size of the expanded olefin polymer and the shape and surface characteristics of the same. Amounts between 0.3 and 4 grams of resin per liter of expanded polyolefin particles are usually adequate. If spherical particles having a mean diameter of from 5 to 20 mm. are used, it is preferred to use amounts of resin of from 0.6 to 2 g./l. of expanded plastics particles. Larger amounts of resin may be used but the advantageous properties of the moldings obtained by the process according to this invention may then be affected detrimentally.

Binders free from solvent are used because evaporation of the solvent during the curing process and thereafter only proceeds slowly so that with binders containing solvents it is not possible to obtain moldings having layers several decimeters in thickness and having satisfactory properties. Small amounts of solvent, for example less than 5% (based on the amount of binder) are not detrimental so that small amounts of solvent may be added to the binders.

The mixtures of particulate expanded olefin polymers and binders may have further additives such as fillers, flame retardants or dyes, incorporated into them. Moldings having particularly advantageous properties may be obtained by adding fibrous materials to the mixtures.

The mixtures are compressed by about 5% to 70% of their original bulk volume. Moldings of bonded particles between which interstices are still present in some places, or which form a homogeneous molding, are obtained depending on the pressure used and the degree of compression. Moldings having particularly advantageous properties are obtained when the particles are compressed by 40% to 60% of their original bulk volume.

Compression of the mixture of expanded particles and binder is carried out in molds. It is preferred to use molds having at least one movable wall. Continuous shaping equipment may also be used, such as is used for the continuous production of moldings from particulate expanded plastics. Such equipment may consist for example of four conveyor belts so arranged that they form a channel. The mixture of expanded particles and binder is introduced at one end of this channel, compressed therein and the resultant strand is discharged at the other end of the channel. The conveyor belts may also be of the apron type. To manufacture wide sheeting it is usually only necessary to use two conveyor belts running parallel to each other, stationary or movable walls being arranged at the sides so that a channel is formed.

The compressed mixture of expanded olefin polymer and binder is allowed to cure under pressure. The time of pressing may be varied within certain limits by using appropriate curing agents. Sometimes it is advantageous to carry out the curing of the mixtures of expanded particles and binder (which are under pressure) at elevated temperature, but the temperature should not exceed the crystalline melting point of the olefin polymer.

According to a particularly advantageous embodiment of the process, the particles of expanded olefin polymer used have had their surface subjected to a treatment which increases the adhesion of the binder. Thus for example the particles may have been treated with mixtures having oxidizing action or may have been subjected to an electric discharge treatment. For example mixtures of sulfuric acid and sodium bichromate, which are allowed to act on the particles for a short time, are suitable. Electric discharge treatment is carried out in the same way as for the treatment of olefin polymer sheeting or film. To increase the resistance of the moldings to high temperatures, it is advantageous to use particles of olefin polymers which contain cross-linked fractions in which some of the molecules are present in cross-linked form. Particles having a gel content of 10% to 85% by weight are particularly suitable.

It is a particular advantage that moldings, such as blocks, boards, and sheets, which have particularly good flexural properties are obtained by the process according to this invention. This is surprising since it would have been expected that the cured binder would form a rigid framework between the olefin particles so that the molding obtained would be rigid.

Moldings in accordance with this invention may be used for many purposes. They have a low dynamic stiffness and are therefore suitable in the form of boards or sheeting for reducing the noise of footsteps beneath floating intermediate flooring. The dynamic stiffness of the moldings (measured according to DIN 52214) has a value of about 1. The expanded material may be used in the form of boards for sound insulation and heat insulation in buildings. It is also suitable as interlayers in composite elements. In the form of pipe coverings the moldings obtained according to this invention may be used for insulating pipes, use being made in particular of moldings containing crosslinked polyolefin particles.

Since the expanded olefin polymers have closed cells the expanded material is suitable as laminate material for the production of lifebelts, ball floats, buoys or for filling cavities in water craft. The expanded plastic is also suitable as buffer layers in packagings, particularly for damping impact in the case of delicate equipment during storage and conveyance. The moldings obtained according to this invention may also be used as upholstery material in the manufacture of furniture and vehicles. For this purpose it is preferable to use moldings of expanded particles having particularly high resilience.

The invention is further illustrated by the following Examples.

EXAMPLE 1

25 liters of expanded polyethylene particles having an average particle size of 8 to 10 mm. and a bulk density of 16 grams/liter is mixed with a mixture of 25 grams of pentaerythritol triglycidyl ether and 9.5 grams of p,p-diaminodicyclohexylmethane. The mixture is introduced into a wooden mold whose walls are lined with polyethylene sheeting, the dimensions of the mold being 25 cm. × 12.5 cm. × 5 cm. The contents of the mold are covered with a piece of polyethylene sheeting. The mold is then closed and the contents are compressed to half their original volume. After having been kept for 24 hours at room temperature, the molding obtained is removed from the mold and kept for another 24 hours at room temperature. Boards having a thickness of 5 cm. and a unit weight of 36 grams/liter are cut from the molding with a hot wire cutting equipment. The boards are suitable for example as cushioning layers in packagings for highly fragile goods.

Particles which contain 90 parts of a copolymer of 80 % by weight of ethylene and 20% by weight of vinyl acetate and 10 parts of polyisobutylene may be used instead of polyethylene particles. The moldings obtained are particularly flexible and in the form of boards or sheets are suitable as insulating material for reducing footstep noise.

EXAMPLE 2

150 liters of expanded particles of polyethylene having a particle diameter of 10 to 15 mm. and a bulk density of 20 g./liter is mixed with 280 grams of an epoxide resin based on bisphenolacetone and epichlorohydrin and 84 grams of diaminodicyclohexylamine (hardener) in an extruder and the mixture is introduced into a wooden mold having the dimensions 100 cm. ×50 cm. ×15 cm. The contents of the mold are compressed by 60% of their original volume and left in this condition for 16 hours at room temperature. The molding obtained is cut by means of a bandsaw into boards having a unit weight of 53 grams/liter.

EXAMPLE 3

1000 liters of expanded particles of a copolymer of 83% by weight of ethylene and 17% by weight of tert-butyl acrylate which have a diameter of 3 to 6 mm. and a bulk density of 30 grams/liter are mixed with 695 grams of a mixture of 70 parts of an unsaturated polyester and 30 parts of monostyrene to which 2 grams of benzoyl peroxide and 0.03 gram of dimethylaniline have been added. The mixture is placed in a mold having the dimensions 100 cm. ×50 cm. ×20 cm. and made of polytetrafluoroethylene and compressed to about 50% of its bulk volume. The mold and contents are kept for two hours at 70° C. A flexible expanded plastics block is obtained having a unit weight of 70 grams/liter.

Moldings can be obtained in the same way from particles which contain a mixture of 95 parts of a copolymer of 73% of ethylene and 17% of tert-butyl acrylate and 5 parts of polyisobutylene. Moldings which are particularly flexible are obtained.

EXAMPLE 4

100 liters of expanded particles of polypropylene having a particle diameter of 20 to 50 mm. and a bulk density of 60 grams/liter are mixed with 380 grams of a polyurethane-forming mixture of adipic acid and butylene glycol and 1.5 times the molar amount of triphenyl-methane-4,4', 4''-triisocyanate and the mixture is placed in a wooden mold having the dimensions 100 cm. ×50 cm. ×15 cm. The contents of the mold are compressed by 60 percent of their original volume and kept for 24 hours in this condition at 40° C. The molding obtained can be parted into boards by means of a bandsaw. The boards may be used as insulating material.

EXAMPLE 5

100 liters of expanded particles of polypropylene whose diameter is 5 to 10 mm. and which have a bulk density of 40 grams/liter are mixed with 300 grams of a mixture of 70% by weight of a polyester of 1 mole of maleic acid, 1 mole of tetrahydrophthalic acid and 2.1 moles of diethylene glycol and 30% by weight of tetramethylolacetylene diurea tetraallyl ether. The mixture is placed in a rectangular mold lined with polytetrafluoroethylene sheeting and is compressed to 50% of the bulk volume. The mold with its contents is kept at 70° C. for 20 hours. A foam block is obtained which can be divided into boards by sawing.

Foam blocks can be obtained in the same way when a mixture of linseed oil and a drier based on a cobalt salt is used instead of the polyester mixture.

We claim:

1. A process for the production of flexible moldings of an expanded olefin polymer which comprises mixing expanded particles of a polymer of ethylene or propylene whose X-ray crystallinity at 25° C. is more than 25% the particles having a diameter of from 3 to 50 mm. and a bulk density of 5 to 200 grams/liter, with at least 0.3 grams per liter of said expanded particles of a curable binder which contains less than 5% solvent based on the amount of binder compressing the mixture to decrease its original bulk volume by 5% to 70% and curing said compressed mixture under pressure.

2. A process for the production of flexible moldings of expanded olefin polymers which comprises mixing expanded particles of a polymer of ethylene or propylene having an X-ray crystallinity which is more than 25% at 25° C., the particles having a diameter of 3 to 50 mm. and a bulk density of 5 to 200 grams/liter, with 0.3 to 4 grams per liter of said expanded particles of a curable binder which contains less than 5% solvent based on the amount of binder, compressing the mixture to decrease its original bulk volume by 5% to 70% and curing said compressed mixture under pressure.

3. A process as claimed in claim 1 wherein the mixture is compressed by 40% to 60% of its original bulk volume.

4. A process for the production of flexible moldings of expanded olefin polymers which comprises mixing expanded particles of a copolymer of ethylene containing 5% to 30% by weight of polymerized units of esters of acrylic acid or methacrylic acid or vinylcarboxylic acid, the particles having a diameter of 3 to 50 mm. and a bulk density of 5 to 200 grams/liter, with 0.3 to 4 grams per liter of said expanded particles of a curable binder which contains less than 5% solvent based on the amount of binder, said binder being based on a polyester resin, and an epoxy resin or a polyurethane-forming mixture, compressing the mixture to decrease its original bulk volume by 5% to 70% and curing said compressed mixture under pressure.

PO-1050
(5/69)

UNITED STATES PATENT OFFICE
CERTIFICATE OF CORRECTION

Patent No. 3,608,031          Dated September 21, 1971

Inventor(s) Fritz Stastny et al

It is certified that error appears in the above-identified patent and that said Letters Patent are hereby corrected as shown below:

First page, left-hand column, after "[45] Patented Sept. 21, 1971" insert -- [73] Assignee  Badische Anilin- & Soda-Fabrik
Aktiengesellschaft
Ludwigshafen am Rhine, Germany
--.

Column 1, line 38, "cles mm." should read -- cles --.

Column 4, line 53, claim 1, "25%" should read -- 25%, --.

Column 6, line 1, claim 4, delete "and".

Signed and sealed this 2nd day of May 1972.

(SEAL)
Attest:

EDWARD M. FLETCHER, JR.
Attesting Officer

ROBERT GOTTSCHALK
Commissioner of Patents